(12) United States Patent
Kageyama

(10) Patent No.: US 6,572,998 B2
(45) Date of Patent: *Jun. 3, 2003

(54) NON-AQUEOUS ELECTROLYTE SECONDARY BATTERY

(75) Inventor: Masayuki Kageyama, Fukushima (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/215,743

(22) Filed: Dec. 17, 1998

(65) Prior Publication Data

US 2001/0006746 A1 Jul. 5, 2001

(30) Foreign Application Priority Data

Dec. 19, 1997 (JP) .............................. 9-351739

(51) Int. Cl.[7] .......................... H01M 2/02; H01M 2/04; H01M 2/12; H01M 4/48; H01M 10/52
(52) U.S. Cl. ............................. 429/56; 429/59; 429/62; 429/162; 429/163; 429/175; 429/218.1; 429/231.1
(58) Field of Search .............................. 429/56, 57, 58, 429/59, 61, 62, 162, 163, 175, 176, 218.1, 231.1

(56) References Cited

U.S. PATENT DOCUMENTS

| | | | |
|---|---|---|---|
| 4,182,028 A | | 1/1980 | Epstein et al. .............. 29/623.2 |
| 5,576,121 A | * | 11/1996 | Yamada et al. .............. 429/220 |
| 5,783,326 A | * | 7/1998 | Hasebe ........................ 429/57 |

FOREIGN PATENT DOCUMENTS

| | | |
|---|---|---|
| EP | 0 081 339 | 6/1983 |
| EP | 0 225 679 | 6/1987 |
| EP | 0 810 677 | 12/1997 |
| JP | 61-285655 | 12/1986 |
| JP | 1-163 960 | 6/1989 |
| JP | 7-57722 | 3/1995 |

OTHER PUBLICATIONS

Patent Abstracts of Japan, vol. 011, No. 148 (E–506), May 14, 1987, 1 page (JP 61 285655, Dec. 16, 1986.
Patent Abstracts of Japan, vol. 013, No. 435 (E–825), Sep. 28, 1989, 1 page (JP 01 163960, Jun. 28, 1989).
Patent Abstracts of Japan, vol. 095, No. 006, Jul. 31, 1995, 1 page (JP 07 057722, Mar. 3, 1995).
Patent Abstracts of Japan, vol. 096, No. 006, Jun. 28, 1996, 1 page (JP 08 031402, Feb. 2, 1996).
Patent Abstracts of Japan, vol. 097, No. 006, Jun. 30, 1997, 1 page (JP 09 035748, Feb. 7, 1997).
Patent Abstracts of Japan, vol. 097, No. 012, Dec. 25, 1997, 1 page (JP 09 213286, Aug. 15, 1997).
Patent Abstracts of Japan, vol. 098, No. 004, Mar. 31, 1998, 1 page (JP 09 320550, Dec. 12, 1997).

* cited by examiner

*Primary Examiner*—Patrick Ryan
*Assistant Examiner*—Jonathan Crepeau
(74) *Attorney, Agent, or Firm*—Bell, Boyd & Lloyd LLC

(57) ABSTRACT

A non-aqueous electrolyte secondary battery having a structure which enables an electrode device to easily be inserted into a battery can thereof even if the thickness of the battery is reduced. Thus, excellent productivity and reliability can be realized. A non-aqueous electrolyte secondary battery according to the present invention has a structure that a largest opening of the battery can is hermetically sealed by a battery cover having a terminal.

6 Claims, 7 Drawing Sheets

NON-AQUEOUS ELECTROLYTE SECONDARY BATTERY

BACKGROUND OF THE INVENTION

1. Field of the Invention

The present invention relates to a non-aqueous electrolyte secondary battery for use in a power source for a portable electronic apparatus or the like, and more particularly to an improvement in the shape of a battery.

2. Related Background Art

Since new portable electronic apparatuses including camera-video tape recorder hybrid apparatuses, portable telephones and laptop computers have been widely used in recent years, a need for rechargeable secondary batteries has arisen in place of disposable primary batteries.

Hitherto, hydraulic electrolyte secondary batteries have been employed which include nickel-cadmium batteries. The foregoing hydraulic electrolyte secondary batteries, however, suffer from excessively low discharge potentials. What is worse, the weight and volume of the battery cannot satisfactorily be reduced. Thus, a requirement for raising the energy density cannot be met.

Therefore, non-aqueous electrolyte secondary batteries, such as lithium ion secondary batteries, have been suggested and put to practical use because of their higher energy densities than those of the hydraulic electrolyte secondary batteries.

The non-aqueous electrolyte secondary batteries have been formed into cylindrical batteries each having an electrode device wound into a spiral shape and inserted into a cylindrical battery can; laminated electrode devices formed by laminating folded electrodes or positive and negative electrodes in the form of rectangles; and rectangular batteries each of which is formed by inserting, into a rectangular battery can, a coil electrode device constituted by winding elongated positive and negative electrodes. The rectangular battery has a space efficiency superior to that of the cylindrical battery.

The size and weight of each portable electronic apparatus have furthermore been reduced. Also the thicknesses of the apparatuses have been reduced. It leads to a fact that reduction in the thickness of the second batteries serving as the power sources for the electronic apparatuses has been required.

The conventional rectangular and non-aqueous electrolyte secondary batteries have a structure as shown in FIG. 1 that an opening 21a is formed in a surface of a battery can 21 having a minimum area. Therefore, the battery can 21 required to have a reduced thickness cannot easily be machined in spite of a large quantity of active substances which can be accommodated in the battery can 21.

When further reduction in the thickness of the battery is required, also the thickness of an electrode device 22 which must be accommodated in the battery can 21 is reduced. As a result, the hardness of the electrode device 22 decreases in a direction indicated by an arrow X shown in FIG. 1. Therefore, there arises a problem when the electrode device 22 is inserted into the battery can 21 in a direction (indicated by an arrow Y shown in FIG. 1) in parallel with a direction in which the electrodes are stacked. That is, the electrode device 22 is undesirably deformed because of contact resistance caused between the electrode device 22 and the inner surface of the battery can 21, as shown in FIG. 2. As a result, the electrode device 22 cannot easily and smoothly be inserted into the battery can 21.

If the thin battery is employed, the terminal cannot easily be formed on a battery cover which is provided for the surface of the battery can having the minimum area. In this case, a space for a safety unit, such as a split valve, cannot easily be obtained. Moreover, a lead wire which must be drawn out from the terminal of the battery to an electronic apparatus cannot easily be welded.

To easily insert the electrode device into the battery can, it might be considered feasible to employ a method in which the thickness of the electrode device is reduced. Thus, the clearance between the battery can and the electrode device is enlarged in order to reduce the contact resistance. In the foregoing case, pressure which can be applied to the electrode device is, however, lowered. Thus, force for bringing the positive electrode and the negative electrode into hermetic contact with each other is reduced. As a result, movement and reactions of ions cannot smoothly be performed. Hence, there is apprehension that satisfactory characteristics cannot be obtained from the battery.

SUMMARY OF THE INVENTION

In view of the foregoing, an object of the present invention is to provide a non-aqueous electrolyte secondary battery having a structure with which an electrode device can easily be inserted into a battery can thereof and a terminal can easily be formed even if the thickness of the battery is considerably reduced.

To achieve the above-mentioned object, according to one aspect of the present invention, there is provided a non-aqueous electrolyte secondary battery comprising: a battery can which accommodates an electrode device and non-aqueous electrolyte, wherein a largest opening of the battery can is hermetically sealed by a battery cover incorporating a terminal.

It is preferable that the battery cover has a safety unit which outwards releases internal pressure of the battery when the internal pressure of the battery has been raised to a predetermined pressure.

It is preferable that the safety unit incorporates at least a member, which is selected from a group consisting of a current interrupting unit and a Positive Temperature Coefficient device, and a split valve.

It is preferable that the battery cover has an electrolyte injecting opening through which the electrolyte is injected.

It is preferable that the electrode device is formed into a laminate constituted by laminating a positive electrode and a negative electrode substantially in parallel with the battery cover through a separator.

It is preferable that leads drawn out from the electrode device and laid substantially in parallel with the battery cover are connected to the terminal.

It is preferable that the battery can is formed into a rectangular shape.

It is preferable that the height of the battery can from a bottom surface thereof to the battery cover is 0.5 mm to 6 mm.

Other objects, features and advantages of the invention will be evident from the following detailed description of the preferred embodiments described in conjunction with the attached drawings.

DESCRIPTION OF THE PREFERRED EMBODIMENTS

Embodiments of a non-aqueous electrolyte secondary battery according to the present invention will now be described with reference to the drawings.

Figure 1:
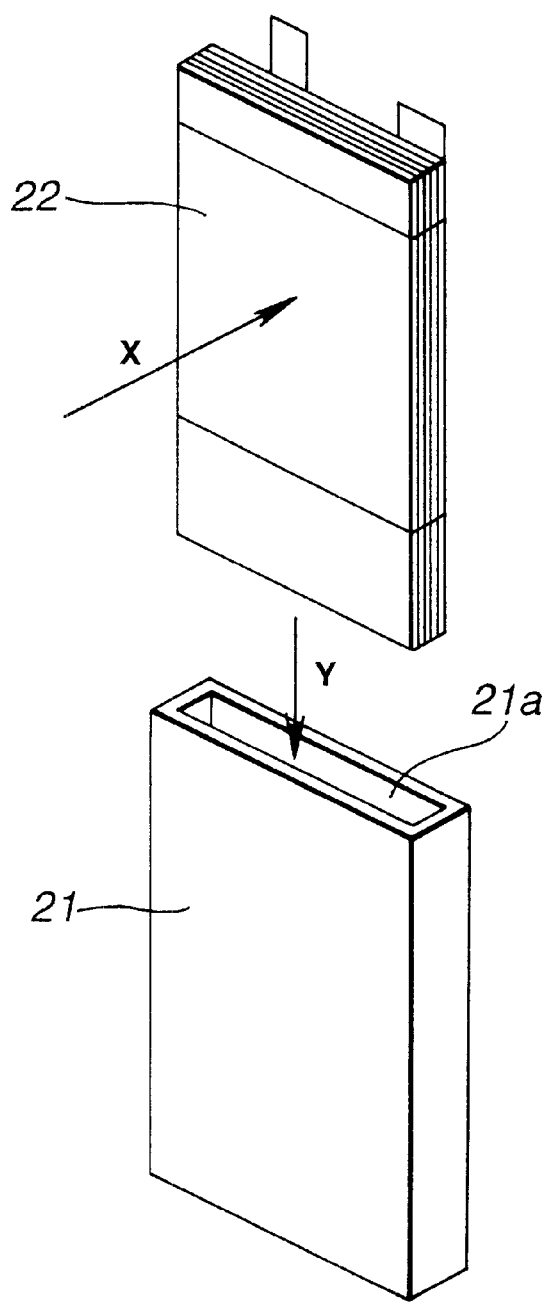
FIG. 1 is a perspective view showing a state in which an electrode device is inserted into a minimum opening of a battery can.
Figure 2:
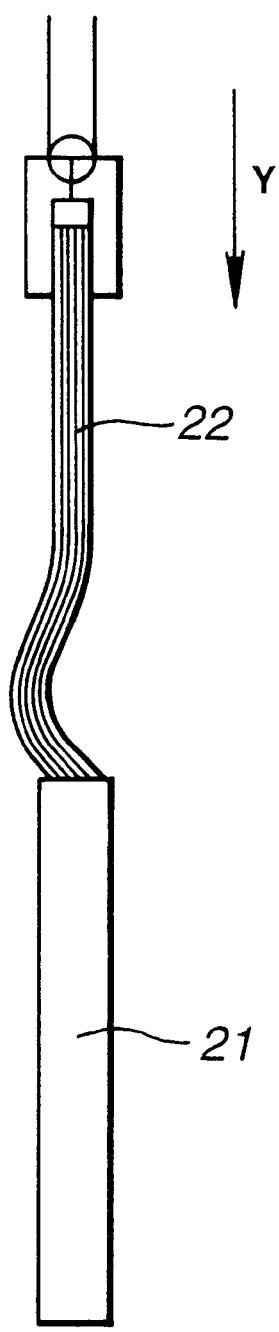
FIG. 2 is a side view showing a state in which the electrode device is inserted into the minimum opening of the battery can.
Figure 3:
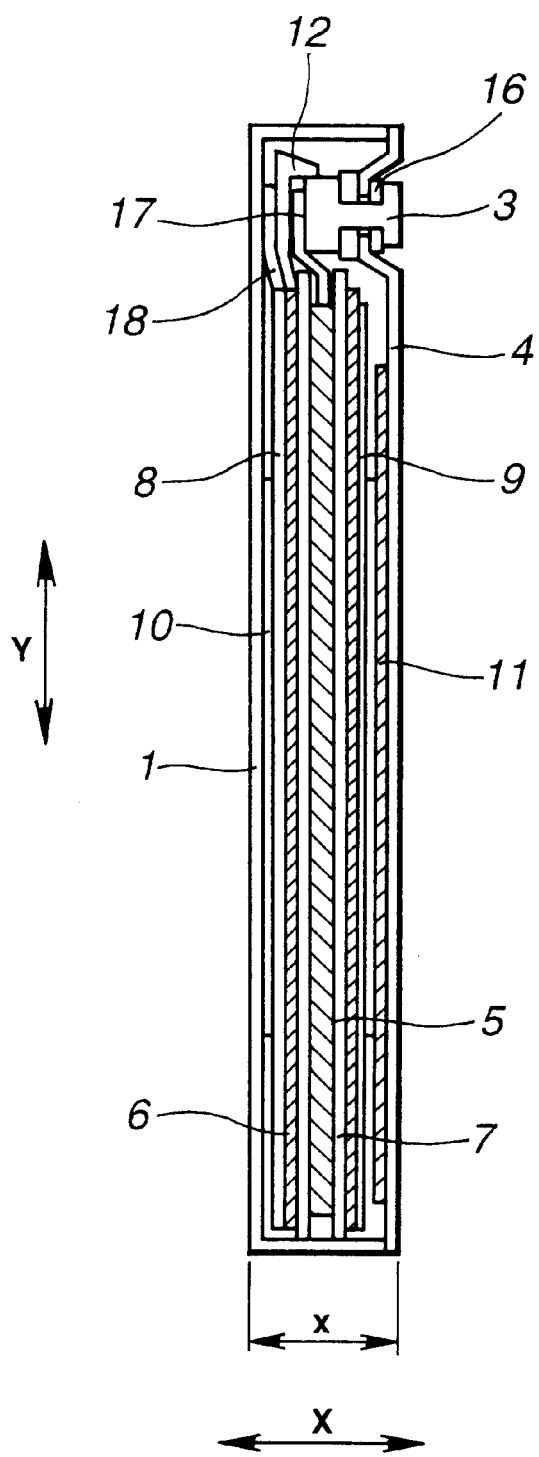
FIG. 3 is a cross sectional view showing the structure of a non-aqueous electrolyte secondary battery according to the present invention.
Figure 4:
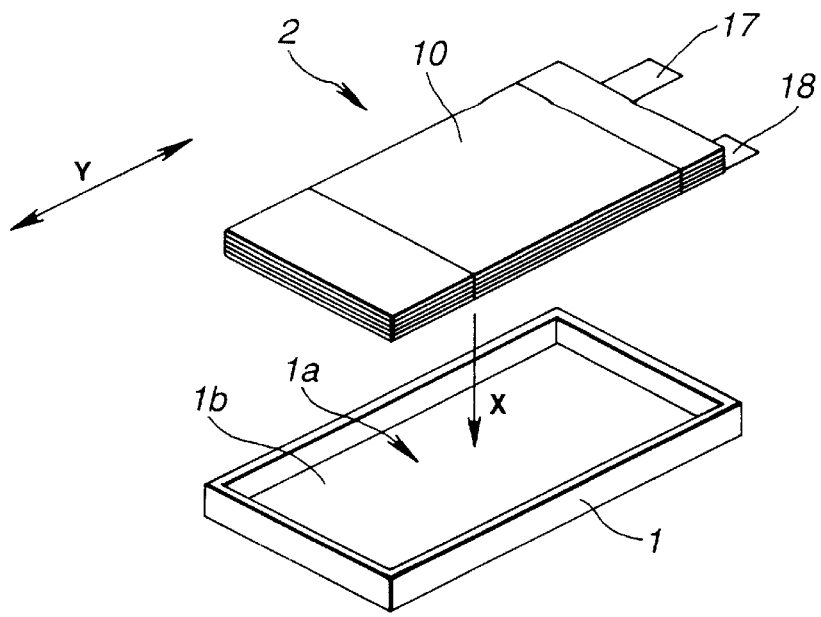
FIG. 4 is a perspective view showing a state in which an electrode device is inserted into a battery can of the non-aqueous electrolyte secondary battery according to the present invention.
Figure 5:
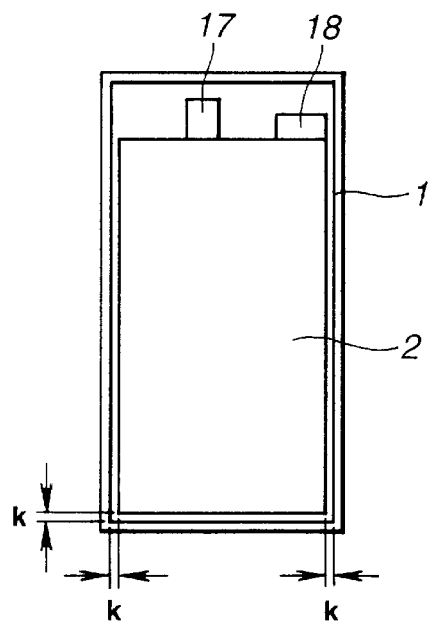
FIG. 5 is a top view showing a state in which the electrode device has been inserted into the battery can of the non-aqueous electrolyte secondary battery according to the present invention.

As shown in FIGS. 3 to 5, the non-aqueous electrolyte secondary battery according to the present invention incorporates an electrode device 2 accommodated through a largest opening 1a of a battery can 1 formed into a flat and rectangular shape. The largest opening 1a is hermetically sealed by a battery cover 4 which incorporates a terminal 3.

The electrode device 2 incorporates a positive electrode 5 and a negative electrode 6 formed into rectangular shapes and laminated through a separator 7. A collecting plate 8 and a pressing plate 9 are disposed at two ends of the electrode device 2. A device-bonding tape 10 is used to secure the end portion of the electrode device 2. As shown in FIG. 4, the electrode device 2 is inserted into the battery can 1 through the largest opening 1a of the battery can 1 in a direction indicated by an arrow X. The electrode device 2, a device-pressing plate 11 and an insulating plate 12 are collectively inserted into the battery can 1.

The electrode device 2 may be either of a laminated electrode device formed by laminating a plurality of combinations of plate-like positive and negative electrodes or a coil-type electrode device formed by turning elongated positive and negative electrodes.

Figure 6:
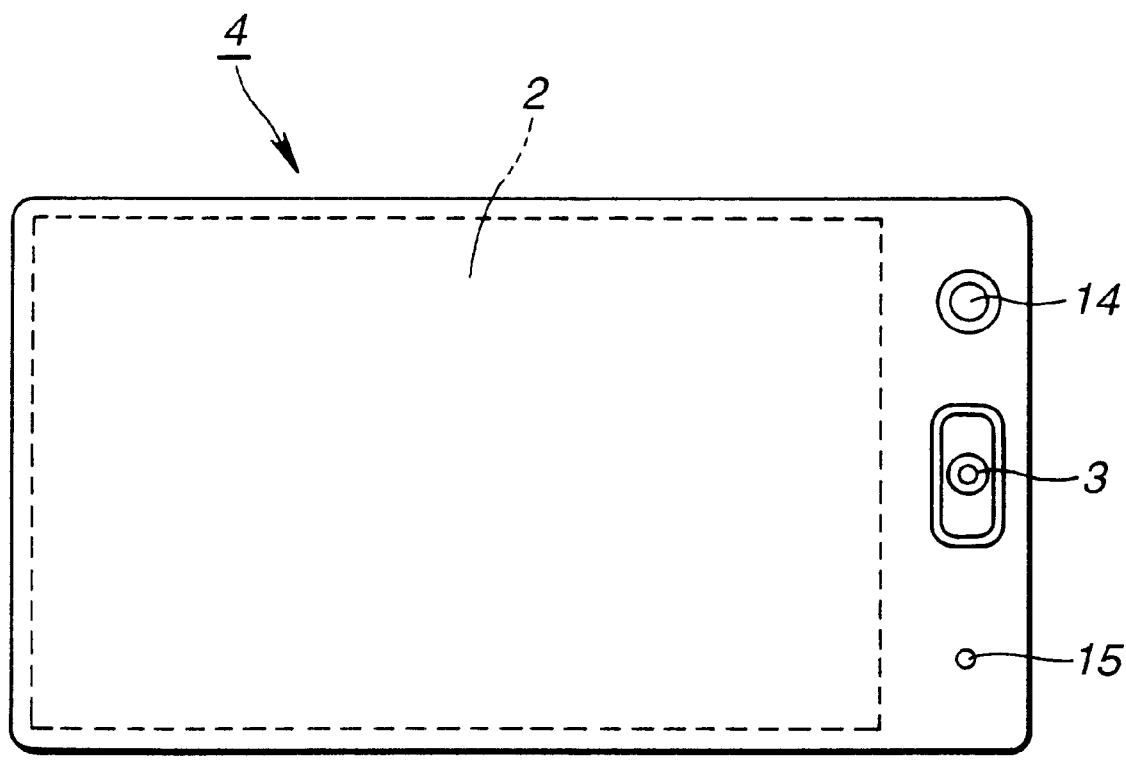
FIG. 6 is a top view showing the structure of a battery cover of the non-aqueous electrolyte secondary battery according to the present invention.

As shown in FIG. 6, the battery cover 4 is provided with the terminal 3, a split valve 14 and an electrolyte injecting opening 15 disposed on a surface of the battery cover 4 opposite to the electrode device 2.

The terminal 3 is joined to the battery cover 4 through an insulating portion 16. An end of the terminal 3 is electrically connected to the positive electrode 5 in the battery can 1 through a positive-electrode lead 17. Another end of the terminal 3 is electrically connected to an external connecting terminal so that a positive terminal is formed. On the other hand, a negative-electrode lead 18 drawn out from the negative electrode 6 is electrically connected to the battery can 1 through the collecting plate 8. Thus, the battery can 1 has a polarity which is different from that of the terminal 3. The positive-electrode lead 17 and the negative-electrode lead 18 are drawn out in direction Y in which the electrode device 2 is laminated, that is, substantially in parallel with the battery cover 4. Then, the positive-electrode lead 17 and the negative-electrode lead 18 are connected by welding or the like in parallel with the connecting surface of the terminal 3 or the battery can 1.

The split valve 14 is constituted by metal foil, such as nickel foil, structured to have a splitting pressure adjusted to a predetermined pressure. If the pressure in the battery can 1 is raised for some reason, the split valve 14 is split. Thus, the pressure in the battery can 1 is directly released to the outside of the non-aqueous electrolyte secondary battery. The electrolyte injecting opening 15 is an opening through which the electrolyte is injected into the battery can 1. After the battery has been assembled, the electrolyte injecting opening 15 is welded by resistance welding or the like so as to be sealed.

In addition to the split valve 14, the battery cover 4 structured as described above may have a current interrupting mechanism for interrupting an electric current if the pressure in the battery can 1 is raised. A Positive Temperature Coefficient device may be provided which interrupts an electric current because resistance thereof is increased if the temperature is raised.

Figure 7:
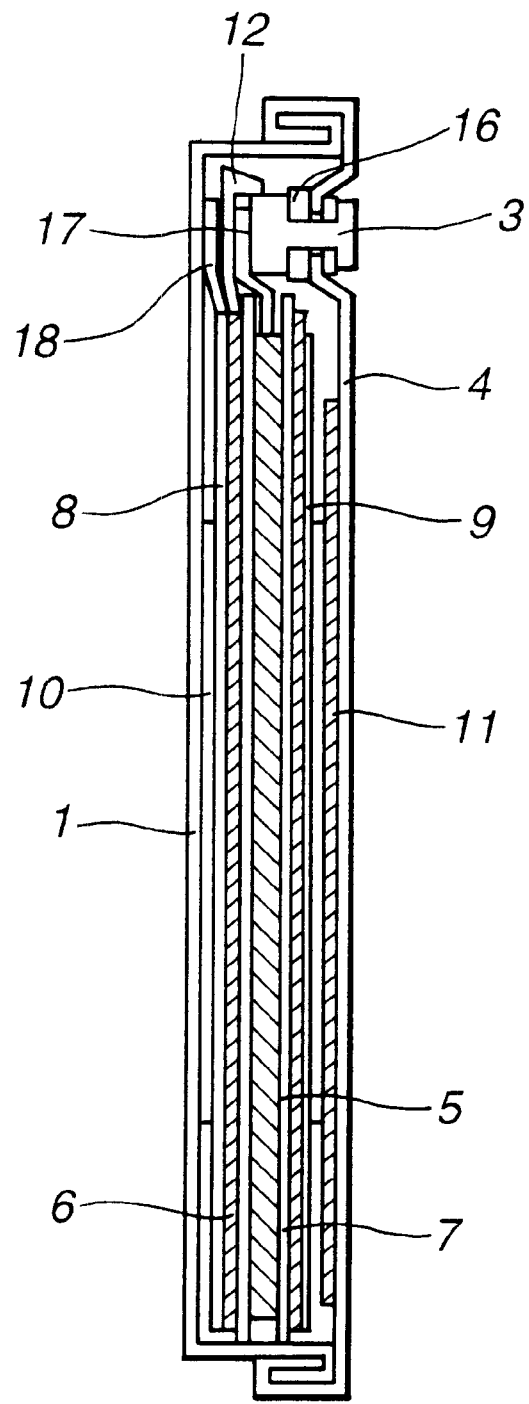
FIG. 7 is a cross sectional view showing the structure of another embodiment of the non-aqueous electrolyte secondary battery according to the present invention.

The battery cover 4 is joined to the largest opening 1a of the battery can 1. The battery cover 4 may be joined as described above by welding, as shown in FIG. 3. As shown in FIG. 7, the outer end of the battery cover 4 and the periphery of the opening of the terminal 3 may be caulked. Note that the same elements in FIG. 7 are given the same reference numerals and the same elements are omitted from description.

The battery can 1 may be made of any one of known materials. For example, iron, nickel, stainless steel, aluminum or their alloy may be employed. If corrosion takes place owning to the non-aqueous electrolyte, plating may be performed. The battery can 1 can be manufactured by any one of appropriate methods. For example, a drawing process may be employed such that a nickel-plated steel plate is subjected to an ironing process using a mold.

The battery cover 4 may be made of any one of known materials including iron, nickel, stainless steel, aluminum and their alloy. If corrosion takes place owning to the non-aqueous electrolyte, plating may be performed. The battery cover 4 can be manufactured by any one of known methods. For example, a nickel-plated steel plate is molded by a pressing work. Then, the terminal 3 is caulked. Thus, the battery cover 4 having the terminal 3 can be manufactured. It is preferable that the split valve 14 is provided for the battery cover 4 before or after the pressing work or after the terminal 3 has been formed.

As shown in FIG. 4, the electrode device 2 of the non-aqueous electrolyte secondary battery structured as described above is inserted through the largest opening 1a of the battery can 1 in a direction indicated by an arrow X. The height from a bottom surface 1b to the battery cover 4, that is, the height of the battery in the direction X (hereinafter called thickness x of the battery) is very small. Therefore, the electrode device 2 is not deformed by the contact resistance. As a result, the electrode device 2 can easily and smoothly be inserted. Moreover, clearance k can be created between the battery can 1 and the electrode device 2, as shown in FIG. 5. Therefore, the electrode device 2 can easily and smoothly be inserted into the battery can 1. As described above, the largest opening 1a of the battery can 1 is hermetically sealed by the battery cover 4. Therefore, the productivity can be improved.

The non-aqueous electrolyte secondary battery has the large battery cover 4. Therefore, the terminal 3 can significantly easily be formed. Moreover, the safety unit including the split valve 14 can be provided for the battery cover 4. As a result, the productivity and reliability can be improved.

As described above, the non-aqueous electrolyte secondary battery according to the present invention is structured such that the largest opening 1a of the battery can 1 is hermetically sealed by the battery cover 4 having the terminal 3. Therefore, the thickness of the battery can be reduced.

Specifically, it is preferable that the thickness x of the battery is 0.5 mm or greater, more preferably 0.6 mm or greater. If the thickness x of the battery is smaller than 0.5 mm, the strength of the battery decreases.

It is preferable that the thickness x of the battery is 6 mm or smaller, more preferably 5 mm or smaller. If the thickness x of the battery is greater than 6 mm, the electrode device 2 is able to have sufficient strength. Therefore, the electrode device 2 can easily be inserted also through the opening which is the smallest area of the battery can 1. In the foregoing case, the advantage that the largest opening 1a is provided for the largest surface of the battery can 1 cannot be obtained.

When the structure of the present invention is applied to a lithium secondary battery or a lithium ion secondary battery, the following materials may be employed.

It is preferable that positive-electrode active materials for making the positive electrode 5 contain lithium in a sufficiently large quantity. For example, a composite metal oxide may be employed which contains lithium expressed by general formula $LiMO_2$ (where M is at least any one of Co, Ni, Mn, Fe, Al, V and Ti) and transition metal. As an alternative to this, an interlayer compound may be employed which contains lithium.

Negative electrode active materials for making the negative electrode 6 may be any one of oxides having relatively basic potential, such as iron oxide, ruthenium oxide, molybdenum oxide, tungsten oxide or titanium oxide. As an alternative to this, the negative electrode active materials may be a carbon material permitting doping/dedoping of lithium, lithium alloy and lithium ions.

The carbon material for making the negative electrode 6 may be any one of the following materials: a conjugate resin, such as a phenol resin, an acrylic resin, a vinyl halide resin, a polyimide resin, a polyamideimide resin, a polyamide resin, polyacetylene or poly (p-phenylene); a cellulose derivative; its derivative; and an arbitrary organic polymer compound. In particular, a carbonaceous material or graphite may be employed which includes a furan resin composed of homopolymers or copolymers of furfuryl alcohol or furfural; or petroleum pitch, which can be prepared by performing carbonating such that the foregoing organic material is, for example, baked.

The electrolyte may be non-aqueous electrolyte having a structure that electrolyte is dissolved in non-aqueous solvent For example, the non-aqueous solvent may be any one of the following materials: propylene carbonate, ethylene carbonate, butylene carbonate, diethyl carbonate, dimethyl carbonate, methylethyl carbonate, 1,2-dimethoxyethane, 1,2-diethoxymethane, γ-butyrolactone, valerolactone, tetrahydrofuran, 2-methyltetrahydrofuran, 1,3-dioxolan, 4-methyl-1,3-dioxolan, sulfolane, methylsulfolane, acetonitrile, propyonitrile and their mixture.

The electrolyte which can be dissolved in the above-mentioned non-aqueous solvent may be any one of known materials. It is preferable that any one of the following materials is employed: $LiPF_6$, $LiClO_4$, $LiAsF_6$, $LiBF_4$, $LiB(C_6H_5)_4$, $CH_3SO_3Li$, $CF_3SO_3Li$, $LiN(CF_3SO_2)_3$, $LiC(CF_3SO_2)_3$, $LiCl$ and $LiBr$. It is preferable that $LiPF_6$ is employed.

EXAMPLES

Examples of the present invention will now be described.

Example 1

A flat and rectangle secondary battery shown in FIG. 3 is manufactured.

Initially, the positive electrode 5 is manufactured as follows.

A positive electrode active substance which is 94.5 parts by weight of lithium cobalt oxide ($LiCoO_2$), 3 parts by weight of ketchen black serving as a conductive material and 2.5 parts by weight of polyvinylidene fluoride are mixed. Then, dimethylformamide serving as a dispersant is added so that a slurry material is prepared. Then, the slurry is dried with hot air, the temperature of which is 150° C. by using a spray driver (manufactured by Sakamoto) for organic solvent. Thus, substantially complete spherical powder having an average particle size of 100μ is prepared. The thus-prepared granule mixture is molded into a rectangular shape.

Then, a collector in the form of an aluminum mesh is interposed between the molded mixtures, and then molding is performed to form a rectangular shape. As a result, an elongated positive electrode having a volume density of 3.1 g/ml and size of 39.5 mm×31.0 mm is obtained. A positive electrode lead constituted by aluminum foil having a thickness of 10 μm has been connected to the collector by ultrasonic welding. The thickness of the elongated positive electrode 5 is 0.8 mm.

Then, the negative electrode 6 is manufactured as follows.

Low-expansion mesophase carbon powder containing fixed carbon by 88.5% and having a total expansion ratio of 0% (measured by a dilatometer for use in a heat expansion test for coal) under 250 mesh is processed at 300° C. for one hour in an oxidation atmosphere. Thus, carbonaceous powder a having an average particle size of 20μ is obtained.

Low-expansion mesophase carbon powder containing fixed carbon by 88.5% and having a total expansion ratio of 0% (measured by a dilatometer for use in a heat expansion test for coal) under 250 mesh is processed at 300° C. for one hour in an oxidation atmosphere. Then, the atmosphere is changed to an inert (nitrogen) gas. In the inert gas atmosphere, the material is baked at 900° C. for 3 hours so that a material in the form of coke is obtained which is then pulverized. As a result, carbonaceous powder b having an average particle size of 20μ is obtained.

The carbonaceous powder a and the carbonaceous powder b are mixed at a ratio of 70:30. Then, polyvinyl alcohol (having molecular weight of 500) serving as a binder is added. Water is employed as the solvent for a kneading process. Then, a mesh not less than 150μ nor more than 250μ is employed to perform granulation and adjust the grain size.

Then, pressure is applied to the granulated mixture with a copper mesh so as to be molded into a rectangular shape. Then, the mesh-integrated electrode is processed at 1000° C. for 3 hours in an atmosphere of an inert gas. As a result, an elongated negative electrode made of a sintered body having a size of 41.5 mm×32.0 mm is obtained. The volume density of the carbonaceous portion of the negative electrode 6 was 1.25 g/ml and the true specific gravity was 1.75 g/ml. The thickness of the elongated negative electrode 6 is 0.35 mm.

The manufactured positive electrodes 5 and the negative electrodes 6 are laminated through separators 7 in the form of micro-porous polyethylene films each having a thickness of 30 μm. The laminating order is such that the negative electrode 6, the separator 7, the positive electrode 5, the separator 7 and the negative electrode 6 are sequentially laminated in this sequential order (that is, two negative electrodes, one positive electrode and two separators are provided). Then, the collecting plate 8 and the pressing plate 9 are disposed at two ends of the obtained laminate. A device-bonding tape 10 having a width of 40 mm is used to secure the ends. Thus, the electrode device 2 is manufactured. To collect electric currents from the negative electrode 6, the negative-electrode leads 18 are bundled, and then welded to an end of the collecting plate 8. To collect electric currents from the positive electrode 5, an end of the positive-electrode lead 17 is welded to the terminal 3 joined to the battery cover 4.

Then, the electrode device 2, the device-pressing plate 11 and the insulating plate 12 are accommodated in a flat and rectangle battery can 1 made of iron subjected to nickel plating. The collecting plate 8 is brought into contact with the battery can 1. The battery can 1 and the battery cover 4 are secured to each other by laser welding.

Then, non-aqueous electrolyte in which one mole of $LiPF_6$ is dissolved in mixture solvent composed of 50 vol % propylene carbonate and 50 vol % diethylcarbonate is injected through the electrolyte injecting opening 15. Then, the electrolyte injecting opening 15 is welded so that gastightness in the battery is realized.

According to Example 1, a flat and rectangular secondary battery is manufactured which has a thickness x (height from the bottom surface of the battery can 1 to the battery cover 4) of 3 mm, a height of 48 mm and a width of 34 mm.

Example 2

Two positive electrodes 5 each having a thickness of 0.8 mm are prepared. Three negative electrodes 6 are prepared which consist of two negative electrodes 6 each having a thickness of 0.35 mm and arranged to be disposed at the outermost positions and one negative electrode 6 having a thickness of 0.65 mm. The positive electrodes 5 and the negative electrodes 6 are laminated through four separators 7. Thus, the electrode device 2 is manufactured.

A non-aqueous electrolyte secondary battery according to Example 2 of the present invention is manufactured similarly to Example 1 except for the above-mentioned electrode device 2. The non-aqueous electrolyte secondary battery according to this example is a flat and rectangular battery having a thickness x of 4.5 mm, a height of 48 mm and a width of 34 mm. Note that the battery can 1 must correspond to the designed thickness.

Example 3

Three positive electrodes 5 each having a thickness of 0.8 mm are prepared. Four negative electrodes 6 are prepared which consist of two negative electrodes 6 each having a thickness of 0.35 mm and arranged to be disposed at the outermost positions and two negative electrodes 6 each having a thickness of 0.65 mm. The positive electrodes 5 and the negative electrodes 6 are laminated through six separators 7 so that the electrode device 2 is manufactured.

The non-aqueous electrolyte secondary battery according to Example 3 of the present invention is manufactured similarly to Example 1 except for the above-mentioned electrode device 2. The non-aqueous electrolyte secondary battery according to this example is a flat and rectangular secondary battery having a thickness x of 6 mm, a height of 48 mm and a width of 34 mm. Note that the battery can 1 must correspond to the deigned thickness.

Example 4

In Example 4 of the present invention, a molded positive electrode having size of 39.5 mm×30.0 mm is employed to serve as the positive electrode. As the negative electrode, a molded negative electrode having size of 41.5 mm×31.0 mm is employed. The battery can 1 and the battery cover 4 are secured to each other by caulking so that a flat and rectangular secondary battery (see FIG. 7) is manufactured. The other structure of the battery according to this example are similar to those of Example 1. The battery can 1 must correspond to the designed thickness.

Comparative Example 1

Figure 8:
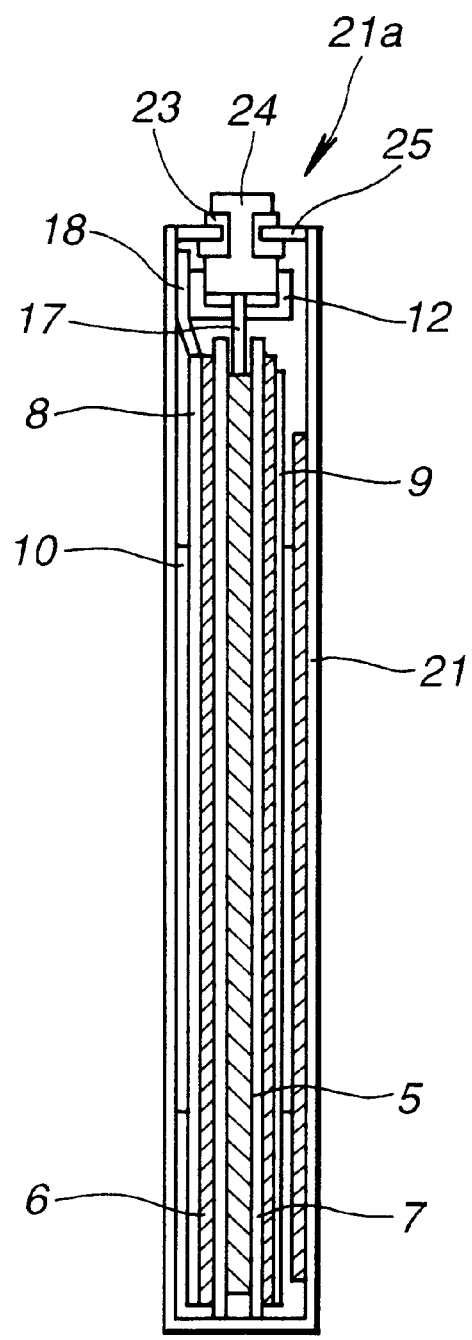
FIG. 8 is a cross sectional view showing the structure of the non-aqueous electrolyte secondary battery incorporating the battery can, the minimum opening of which is hermetically sealed by the battery cover.

As shown in FIG. 8, a battery according to Comparative Example 1 is a flat and rectangular secondary battery (see FIG. 7) incorporating a battery can 21 having an opening 21*a* formed in the surface having a smallest area thereof. As a battery cover for hermetically sealing the opening 21, a terminal 24 is joined through an insulating portion 23. The other structures of the battery according to this comparative example are similar to those according to Example 1.

Comparative Example 2

As shown in FIG. 8, a battery according to Comparative Example 2 is a flat and rectangular secondary battery incorporating a battery can which is a battery can 21 having an opening 21*a* formed in the surface having a smallest area. Moreover, the battery incorporates a battery cover 25 to which a terminal 24 is joined to hermetically seal the opening 21*a* through an insulating portion 23. The other structures of the battery according to this comparative example are similar to those according to Example 2.

Comparative Example 3

As shown in FIG. 8, a battery according to Comparative Example 3 is a flat and rectangular secondary battery incorporating a battery can 21 having an opening 21*a* formed in the surface having a smallest area. Moreover, a battery can 25 is employed which hermetically seal the opening 21*a* and to which a terminal 24 is joined through an insulating portion 23. The other structures of the battery according to this comparative example are similar to those according to Example 3.

Evaluation of Characteristics

One hundred samples of each of the flat and rectangular secondary batteries according to Examples 1 to 4 and Comparative Examples 1 to 3 were manufactured. Then, whether or not insertion of the electrode device into the battery can was performed easily and smoothly was examined. Results were shown in Table 1.

TABLE 1

Result of Insertion of Electrode Device

| | Number of Unsatisfactory Results | Ratio of Unsatisfactory Results [%] |
|---|---|---|
| Example 1 | 0/100 | 0 |
| Example 2 | 0/100 | 0 |
| Example 3 | 0/100 | 0 |
| Example 4 | 0/100 | 0 |
| Comparative Example 1 | 17/100 | 17.0 |
| Comparative Example 2 | 8/100 | 8.0 |
| Comparative Example 3 | 3/100 | 3.0 |

As can be understood from Table 1, the flat and rectangular secondary batteries according to Example 1 to 4 and having the structure that the largest opening 1a of the battery can 1 is hermetically sealed by the battery cover 4 having the terminal 3 enables the electrode device 2 to easily be inserted into the battery can 1 even if the thickness x of the battery is reduced. The insertion of the electrode device 2 can satisfactorily be performed. Thus, batteries exhibiting excellent productivity can be obtained.

On the other hand, the flat and rectangular secondary batteries according to Comparative Examples 1 to 3 and having the structure that the minimum opening 21a of the battery can 21 is hermetically sealed by the battery cover 25 having the terminal 24 results in difficulty in inserting the electrode device 2 into the battery can 21 when the thickness x of the battery is reduced. That is, insertion of the electrode device cannot easily and smoothly be performed.

As described above, according to the present invention, the largest opening of the battery can is hermetically sealed by the battery cover having the terminal. Therefore, even if the thickness of the battery is reduced, the electrode device can easily be inserted into the battery can. Since a large battery cover can be provided, the terminal can easily be formed. Moreover, the safety unit including the split valve can easily be disposed. As a result, a non-aqueous electrolyte secondary battery exhibiting excellent productivity and reliability and having a high energy density can be provided.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A non-aqueous electrolyte secondary battery comprising:
   a battery can which accommodates an electrode device and non-aqueous electrolyte, wherein
   a. a largest opening of said battery can is hermetically sealed by a battery cover incorporating a terminal, wherein said battery cover has a safety unit which outwardly releases the internal pressure of said battery, and wherein said battery cover has a separate electrolyte injecting opening through which the electrolyte is injected; and
   b. said electrode device comprises a plurality of positive electrodes and a plurality negative electrodes, wherein each of said positive electrodes comprise a positive electrode active material selected from the group consisting of a composite metal oxide comprising lithium as $LiMO_2$, wherein M is selected from the group consisting of Co, Ni, Mn, Fe, Al, V, Ti, and a transition metal; wherein each of said negative electrode comprise a negative electrode material selected from the group consisting of iron oxide, ruthenium oxide, molybdenum oxide, tungsten oxide, titanium oxide, and a carbon material which permits doping/dedoping of lithium and lithium alloys; and wherein said electrode device is formed into a laminate constituted by laminating the positive electrodes and negative electrodes substantially in parallel with said battery cover through a plurality of separators.

2. A non-aqueous electrolyte secondary battery according to claim 1, wherein said safety unit incorporates at least a member, which is selected from a group consisting of a current interrupting unit and a Positive Temperature Coefficient device, and a split valve.

3. A non-aqueous electrolyte secondary battery according to claim 1, wherein leads drawn out from said electrode device and laid substantially in parallel with said battery cover are connected to said terminal.

4. A non-aqueous electrolyte secondary battery according to claim 1, wherein said battery can is formed into a rectangular shape.

5. A non-aqueous electrolyte secondary battery according to claim 1, wherein the height of said battery can from a bottom surface thereof to said battery cover is 0.5 mm to 6 mm.

6. A non-aqueous electrolyte secondary battery comprising:
   a battery can which accommodates an electrode device and non-aqueous electrolyte, wherein
   a. a largest opening of said battery can is hermetically sealed by a battery cover incorporating a terminal, wherein said battery cover has a safety unit which outwardly releases the internal pressure of said battery, and wherein said battery cover has a separate electrolyte injecting opening through which the electrolyte is injected; and
   b. said electrode device comprises a plurality of positive electrodes and a plurality of negative electrodes, wherein each of said positive electrodes comprise a positive electrode active material selected from the group consisting of a composite metal oxide comprising lithium as $LiMO_2$, wherein M is selected from the group consisting of Fe, Al, V, Ti, mixtures thereof, and alloys thereof; wherein each of said negative electrodes comprise a negative electrode material selected from the group consisting of iron oxide, ruthenium oxide, molybdenum oxide, tungsten oxide, titanium oxide, and a carbon material which permits doping/dedoping of lithium and lithium alloys; and wherein said electrode device is formed into a laminate constituted by laminating the positive electrodes and the negative electrodes substantially in parallel with said battery cover through a plurality of separators.

* * * * *